Figure 1:
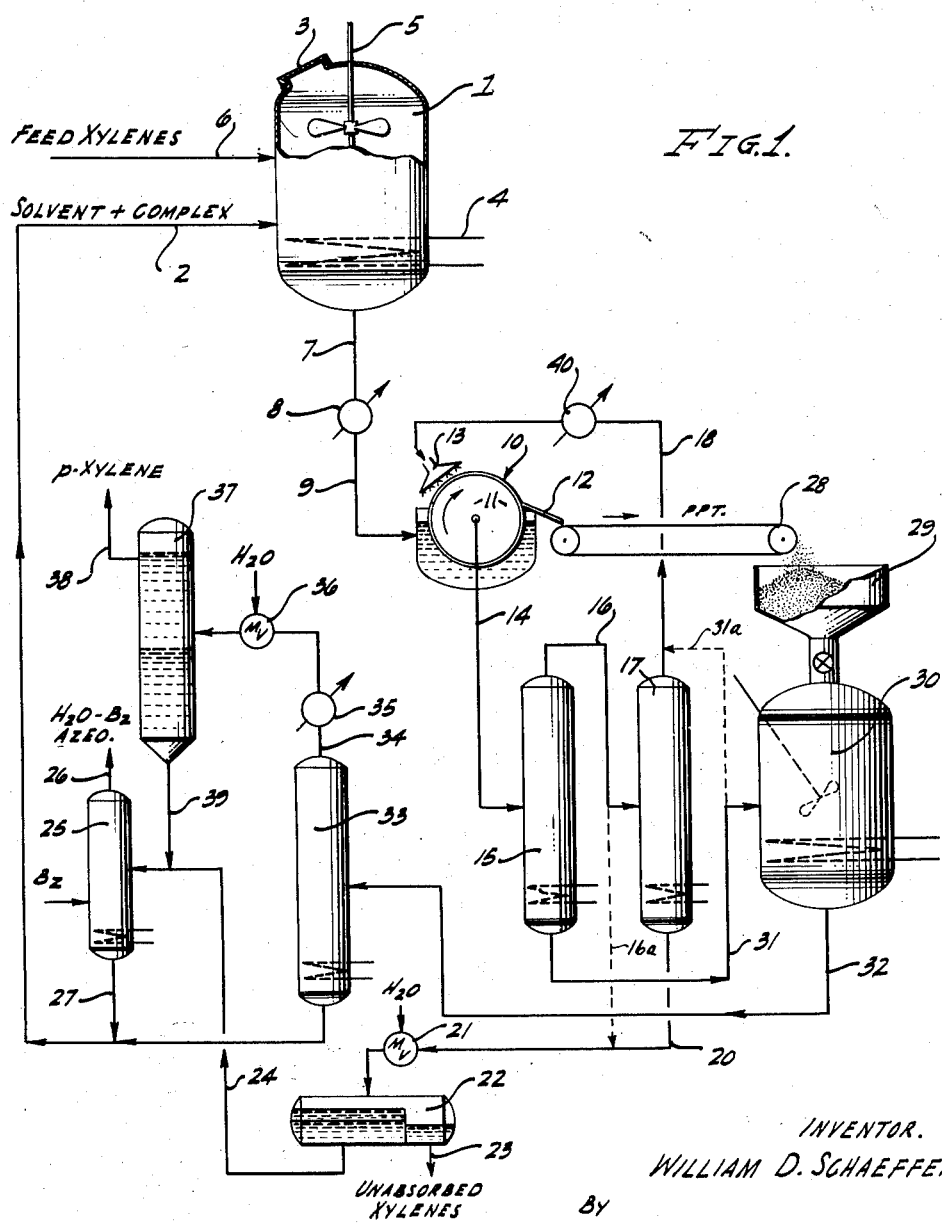

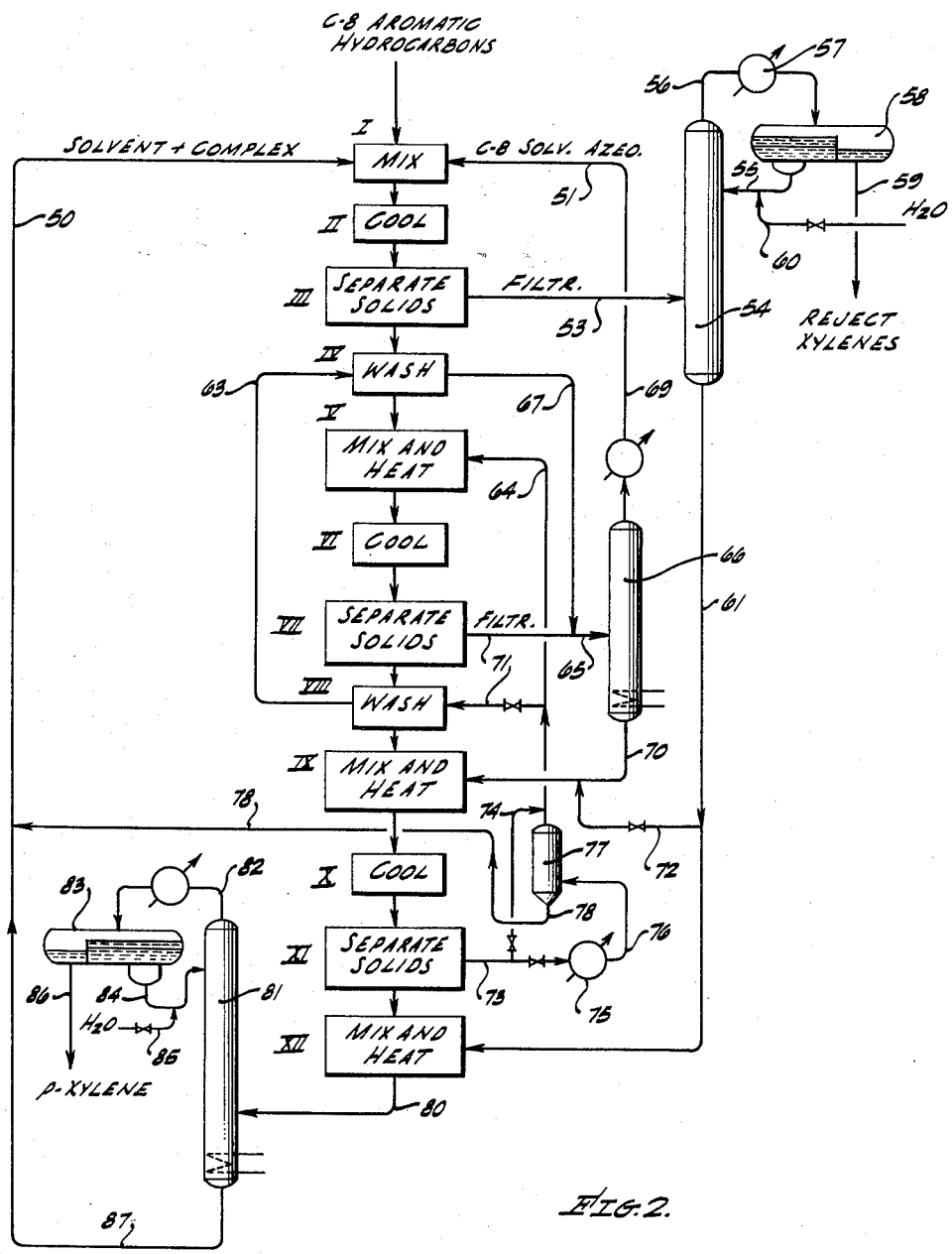

United States Patent Office 2,849,513
Patented Aug. 26, 1958

2,849,513

SEPARATION OF HYDROCARBONS BY CLATHRATE FORMATION WITH WERNER COMPLEX COMPOUNDS

William D. Schaeffer, Ontario, Calif., assignor to Union Oil Company of California, Los Angeles, Calif., a corporation of California Application December 7, 1953, Serial No. 396,636

26 Claims. (Cl. 260—674)

This invention relates to methods for separating organic compounds which differ in molecular configuration, particularly compounds which have similar chemical and physical properties, and are therefore difficultly separable by conventional methods such as fractional distillation or crystallization. Broadly stated, the method consists in selectively absorbing one or more components of the feed mixture into a solid Werner-type complex of a metal salt and a basic nitrogen compound, and thereafter recovering the absorbed component from the complex. Present experimental evidence points toward the theory that those compounds whose molecular configurations most nearly coincide with the crystal-lattice voids of the Werner complex are selectively absorbed thereby, forming what is regarded as a "clathrate" type compound. The formation of such clathrates as practiced herein may also be designated as extractive crystallization.

More specifically, the method of absorption contemplated herein involves first forming a homogeneous solution of the Werner complex plus the total feed mixture in a solvent which is capable of dissolving both the Werner complex and the feed mixture at certain temperatures, but which has a very low solvent capacity for the Werner complex at lower temperatures. After the homogeneous solution is formed, it is then cooled to a point where the complex precipitates out as a solid phase. In precipitating, the complex simultaneously and selectively absorbs one or more components from the feed mixture, which components are thereby segregated into the solid phase. The unabsorbed components of the feed mixture remain dissolved in the solvent. The precipitated clathrate may then be separated by filtration from the solvent phase. The filtrate is then distilled to recover the unabsorbed components of the feed mixture, and the clathrate is redissolved in the hot, stripped solvent, thereby liberating the absorbed component which is recovered preferably by distillation as an azeotrope with the solvent. Alternatively, the clathrate is subjected to stripping with a selective azeotrope former without being redissolved in the solvent. The distillate recovered from such distillation or stripping is found to be substantially richer in compounds corresponding to one particular molecular configuration than was the original feed mixture.

The methods described herein are particularly valuable for separating hydrocarbon isomers. Such isomers for example as meta- and para-xylene are especially difficult to separate by conventional methods. The boiling points of these compounds are very nearly the same, and separation by fractional distillation is therefore not practical, nor do their azeotropes display a sufficient difference in boiling point to permit effective fractionation. Some degree of resolution may be obtained by fractional crystallization, but repeated crystallizations are necessary, with correspondingly low yields, in order to obtain any one of the components in reasonably pure form. Obviously also, the chemical properties of such isomers are no nearly identical as to render separation by conventional chemical procedures very difficult. Moreover, most of the heretofore proposed chemical separation processes, such as selective sulfonation, are inherently uneconomical.

Aliphatic isomers, and isomers containing functional groups such as nitro, amino, halogen, hydroxyl, oxo, or carbonyl, for example, sometimes present similar difficulties in separation, but they may generally be resolved by the present methods. In addition to isomers, other mixtures of difficultly separable compounds may be resolved into their components, such as for example narrow boiling range mixtures of aliphatic, aromatic or naphthenic hydrocarbons, or mixtures thereof.

The separation of xylenes by selective absorption of the para-isomer in Werner complexes has been broadly disclosed and claimed in my copending application Serial No. 274,647, filed March 3, 1952, and now abandoned. However, in using Werner complexes containing gamma-picoline, or other low-boiling organic nitrogen bases, it is found that heating or steam distillation to recover the absorbed p-xylene therefrom causes considerable volatilization and loss of gamma-picoline. These nitrogen bases are rather loosely held by the complex, and any temperature above the boiling point of the particular nitrogen compound tends to cause some vaporization thereof. In the present case this disadvantage is overcome by azeotropically distilling or stripping the absorbed p-xylene from the clathrate with a material which forms an azeotrope with p-xylene, which azeotrope boils sufficiently below the boiling point of the nitrogen base to be readily separable therefrom by fractionation. The solvent should also preferably not form an azeotrope with the nitrogen base. By this means, any nitrogen base which is volatilized is continuously refluxed back to the still bottoms containing the Werner complex. The same principle may be applied to strip the clathrates of absorbed components other than xylenes.

It is therefore a broad object of this invention to provide economical means for separating mixtures of two or more organic compounds which are difficult to separate by ordinary physical or chemical methods.

Another object is to provide suitable solvents to be employed as a medium in the separation of hydrocarbons by extractive crystallization in Werner complexes.

A more specific object is to provide methods whereby the materials which are absorbed into the Werner complex may be recovered therefrom with little or no decomposition of the complex, which is therefore recovered in condition for recycling to the absorption step without preliminary rejuvenation or purification.

A specific object is to provide economical means for separating isomers of closely similar structure such as meta- and paraxylene.

Other objectives will be apparent from the more detailed description which follows:

The present invention is based upon the broad discovery that certain crystalline metal complexes of the Werner type are capable of selectively absorbing or occluding during formation of their crystalline structure, certain organic compounds, while other organic compounds of similar gross physical properties are absorbed to a much smaller extent, or not at all. This basic discovery has been previously described in my above cited copending application. The theoretical explanation for this phenomenon is not known with certainty, but present information indicates that a "clathrate" type compound may be formed with the absorbed organic compound. These clathrates, when saturated with the absorbable compound, are found to contain the absorbed component in a constant proportion or combining ratio, wherein, however, such combining ratio is not necessarily that of any small integer. Present evidence indicates that the absorbed component is occluded within the voids of the crystal lattice, and the selectivity of absorption implies that there is an optimum molecular configuration of absorbate for maximum absorption in a particular crystal lattice. In the present case, the Werner complexes employed are found to favor, for the most part, the absorption of para compounds over the ortho- or meta-isomers, and relatively branched-chain aliphatics as opposed to relatively straight-chain aliphatics of the same or similar molecular weight. However, by suitably modifying the constituents of the Werner complex employed, this order may be reversed so that meta- and ortho-compounds may be selectively absorbed in preference to the para-isomers, and straight-chain aliphatics in preference to branched-chain.

The Werner-type complexes employed herein are made up of at least three components. The fundamental unit is a metal having an atomic number above 12 which is capable of forming coordinate complexes of the Werner type. This includes primarily the metals of groups I–B, II–B, VI–B, VII–B, and VIII of the periodic table, such for example as iron, cobalt, nickel, copper, zinc, cadmium, silver, manganese, chromium, mercury, and molybdenum. Aluminum may also be used in some instances.

The second component consists of one or more organic nitrogen bases which are bound to the central metal atom through coordinate bonds. The complexes are mainly of the tetra- and hexa-coordinate types, wherein the metal atom is coordinated with four or six molecules of the nitrogen base to form a positive radical which is usually divalent. Examples of suitable nitrogen bases are set forth hereinafter.

The positive radical (metal+nitrogen base) is in turn combined electrovalently with a suitable negative radical, such for example as thiocyanate —SCN, isothiocyanate —NCS, azide —NNN, cyanate —OCN, isocyanate —NCO, cyanide —CN, sulfate =SO$_4$, nitrate —NO$_3$, nitrito —ONO, chloride —Cl, bromide —Br, iodide —I, phosphate ≡PO$_4$. A group of negative radicals found to be particularly effective for the present purposes consists of the monovalent radicals thiocyanate, isothiocyanate, azide, cyanate, isocyanate and cyanide. However, any negative radical may be utilized which is capable of producing a crystalline complex with the above positive radical, which complex will exhibit the desired selectivity for the particular isomer or compound which is to be absorbed. Such complexes are described generally in Modern Aspects of Inorganic Chemistry, Emeleus and Anderson, 79–178, Van Nostrand Co., 1946, and also in Textbook of Inorganic Chemistry, vol. X, M. M. J. Sutherland, J. P. Lippincott Co., 1928. These references also describe general methods which may be employed for preparing the particular complexes employed herein.

The complexes concerned herein may be designated by the following general formula:

$$X \cdot Z_y \cdot A_n \quad (1)$$

wherein X is the metal atom as defined above, Z is the nitrogen base, $y$ is a number from 2 to 6, A is the negative radical as above defined, and $n$ is a number from 1 to 3.

The nitrogen bases employed in the above formula should be such as to give a maximum selective absorption for the particular isomer which is to be absorbed into the crystal lattice of the complex. For example, if it is desired to absorb p-xylene, a very suitable nitrogen compound is gamma-picoline. 4-ethylpyridine is also suitable. Not all nitrogen bases are equally effective in forming complexes which will absorb the desired component. For example, the beta-picoline complex with nickel thiocyanate is not as effective as the gamma-picoline complex for absorbing para-xylene, presumably because of the steric effects of the 3-methyl group. However, the beta-picoline complex may be used advantageously for absorbing other compounds. Also a mixture of beta- and gamma-picoline may be employed to form a mixed-crystal form of Werner complex which is suitable for absorbing p-xylene. The nitrogen bases should therefore be selected by a judicious combination of theoretical reasoning and actual testing of the complexes with the particular mixture to be separated. The overall molecular dimensions of the nitrogen base should approximate the molecular dimensions of the compound to be absorbed in the complex. Suitable nitrogen compounds for various applications include for example, mono-, di- and tri-alkyl amines, arylamines, mono- and di-N-substituted arylamines, amino-naphthenes; heterocyclic amines such as pyridine, substituted pyridines, pyrroles, substituted pyrroles, piperidines; polyamines such as ethylene diamine; and amines containing other non-interfering functional groups. The heterocyclic amines are a preferred class, and especially the 4-alkyl pyridines, or other 4-substituted pyridines.

The Werner complexes defined by Formula I above may be prepared by any of several different methods. According to one method the complex may be formed by precipitation from an aqueous solution. This is ordinarily accomplished by first forming in solution the desired metal salt, containing the X and A components of Formula I. To this solution is then added from about two to six molar equivalents of the desired nitrogen base Z. The insoluble complex thereupon precipitates and is removed and dried. The drying may be accomplished in a stream of air at room temperature, or slightly elevated temperatures may be employed. The substantially dry, powdered or granular complex may then be employed directly in the separation techniques described herein.

Alternatively the complex may be formed in situ during the first step of the herein described process by first dissolving the desired metal salt in the solvent and then adding the desired molar ratio of the nitrogen base. The complex so formed will remain in solution if the solvent is sufficiently hot, and will precipitate from cooler solutions. In any event, the mixture is then heated sufficiently to dissolve both the complex and the feed mixture to be resolved, this constituting the first step of the process.

Examples of suitable complexes which may be employed, corresponding to Formula I above, are as follows:

[Ni(γ-picoline)$_4$(SCN)$_2$]

[Cu(γ-picoline)$_4$(SCN)$_2$]

[Hg(γ-picoline)$_4$(NNN)$_2$]

[Ni(1-hexylamine)$_6$(SCN)$_2$]

[Co(pyridine)$_4$(OCN)$_2$]

[Zn(γ-picoline)$_2$Cl$_2$]

[Fe(imidazole)$_4$(SCN)$_2$]

[Fe(pyrrole)$_4$(SCN)$_2$]

[Cd(γ-picoline)$_4$(CN)$_2$]

[Zn(aniline)$_4$(SCN)$_2$]

[Ag(γ-picoline)$_2$(NNN)]

[Zn(aniline)$_4$(CN)$_2$]

[Cr(pyridine)$_4$SO$_4$]

[Fe(1-hexylamine)$_4$(SCN)$_2$]

[Ti(isoquinoline)$_3$(NH$_3$)$_3$(C$_2$O$_4$)$_2$]

[Mn(4-ethylpyridine)$_4$(SCN)$_2$]

Obviously many other compounds similar to the above could be employed, not all of which would give effective or optimum separation of all isomer pairs, but which should be selected to meet the specific peculiarities of the isomers concerned.

The amount of complex employed, relative to the feed mixture, depends upon its specific capacity for absorbing the particular isomer concerned, and also upon the proportion of that isomer present in the original mixture. The complexes are found in general to be capable of absorbing between about 5% and 70% by weight of absorbable compounds. Optimum efficiency may require that more or less than this "stoichiometric" amount of complex be employed, depending upon its relative capacity for other components in the mixture to be resolved, and the number of absorption cycles or stages which are permissible. In general, the amount of complex to be employed may vary between about 0.25 and 20 parts by weight per part of absorbable component in the mixture. Smaller proportions of complex will generally yield a purer absorbate, while the larger proportions result in more complete removal of absorbate from the mixture, on the basis of a single-stage batch absorption.

The solvents employed herein may be defined broadly as those which are capable of dissolving appreciable amounts of both the Werner complex and the feed mixture to be resolved at a given temperature range, but in which the Werner complex is appreciably less soluble at lower temperatures. In addition, the solvent should also have a boiling point sufficiently above or below that of the feed mixture to permit ready separatioin thereof by fractional distillation. In its preferred form, the solvent should also be one which forms a low boiling azeotrope with the absorbed component of the feed mixture, but not with the nitrogen base component of the complex. Ordinarily any solvent boiling at least about 5° C. above or below the boiling point of the component or components of the feed mixture to be absorbed may be employed. A particularly valuable group of solvents for these purposes are the lower aliphatic monohydroxy compounds containing at least 3 carbon atoms especially glycol monoethers. Specific glycol monoethers include for example the methyl, ethyl, isopropyl, n-propyl, isobutyl, n-butyl, tert-butyl, isoamyl, amyl, and hexyl monoethers of ethylene glycol, diethylene glycol, triethylene glycol, 1,2-propylene glycol, 1,3-propylene glycol, polypropylene glycols, 1,2-butylene glycol, 1,3-butylene glycol, 2,3-butylene glycol, 1,4-butylene glycol, etc. The lower alkyl diethers of glycerol and other polyhydroxy compounds may also be employed. In addition the aliphatic mono-alcohols containing more than three carbon atoms may also be employed, including n-butyl alcohol, isobutyl alcohol, sec.-butyl alcohol, tert-butyl alcohol, isoamyl alcohol, n-amyl alcohol, hexyl alcohols, heptyl alcohols, octyl alcohols, nonyl alcohols, decyl alcohols, etc. A preferred group of solvents are those aliphatic or cycloaliphatic compounds which contain one hydroxyl group and at least one ether linkage. The various Cellosolve derivatives of ethylene glycol or propylene glycol are particularly suitable, from methyl to butyl Cellosolve. Other materials such as water, ethanol, or hydrocarbons may also be added in some cases to modify the solvent properties of the primary solvent. The above types of solvents are satisfactory for separating aromatic hydrocarbons in general. Other solvents may be used for resolving mixtures of aliphatic hydrocarbons.

A particularly advantageous group of solvents for resolving aromatic hydrocarbons consists of those compounds which not only form a binary azeotrope with the components of the feed mixture, which azeotrope boils lower than the nitrogen base, but which also form a ternary azeotrope with water and the components of the feed mixture. The ternary azeotrope should boil at a substantially lower temperature than the binary azeotrope. By employing such solvents, the ternary azeotrope of solvent, water and feed component may be taken overhead from a distillation column, condensed and separated into a liquid hydrocarbon phase and an aqueous-solvent phase. The latter phase may then be continuously recycled to the distillation column to azeotrope more of the feed component. By operating in this manner, the water washing and benzene azeotroping steps shown at 21, 36 and 25 in Figure 1 may be eliminated with substantial economies in operation. Solvents which are particularly adaptable to this mode of operation in connection with xylene separations are methyl Cellosolve, ethyl Cellosolve, propyl Cellosolve, and the like. This mode of operation is illustrated specifically in the attached Figure 2.

The methods described herein are particularly adapted for the resolution of close-boiling mixtures of aromatic hydrocarbon isomers such as may occur in petroleum fractions, and especially those petroleum fractions which result from catalytic reforming operations such as hydroforming, platforming, etc. For example, there may be obtained from such reformates a particularly refractory cut boiling between about 138–145° C., and consisting essentially of the C–8 aromatic hydrocarbons, ethylbenzene, o-, m- and p-xylene in varying proportions. By close fractionation, it is ordinarily possible to separate out the ethylbenzene and o-xylene, but the meta- and para-xylenes are almost impossible to separate by fractional distillation since the former boils at 139.1° C. and the latter at 138.3° C. By the methods described herein para-xylene may be obtained essentially free of meta-xylene and vice versa. The ortho-xylene remains in the unabsorbed phase with the meta-isomer and part of the ethylbenzene. The para-xylene and part of the ethylbenzene are absorbed into the complex as the absorbate phase. Each of these phases, when recovered, may be further resolved if desired by conventional methods such as fractional crystallization or fractional distillation to obtain the pure individual isomers. In general the aromatic para-isomers may be separated from the ortho- and meta-isomers. It is not essential, however, that the feed mixture consist of isomers; the methods herein described may be applied to any mixtures of close-boiling hydrocarbons which are difficultly separable by conventional methods, particularly aromatic hydrocarbons. For example p-xylene may be selectively absorbed from any mixture of difficultly separable hydrocarbons, which mixture may also include aliphatic or naphthenic hydrocarbons.

The process may perhaps be more readily understood by reference to the accompanying Figure 1 which is a flow sheet illustrative of one particular semi-continuous method wherein the solvent is separated from the hydrocarbons by water washing. This modification will be described with specific reference to separating a mixture of ortho-, meta- and para-xylenes and ethylbenzene. It will be understood, however, that the general procedure described is equally applicable, with minor modifications, to other feed mixtures.

The first step in the process consists in forming in the mixing vessel 1 a homogeneous solution of the solvent, the desired Werner complex and the feed mixture of C–8 aromatic hydrocarbons. To initiate the process the solvent may be admitted to the mixing vessel through line 2 and the preformed, solid Werner complex may be added through the port 3. Preferably sufficient Werner complex should be employed to yield a nearly saturated solution thereof at slightly below the boiling point of the xylenes. In order to achieve complete and rapid solution under these conditions it may be desirable to heat the mixture by means of steam coil 4, and agitate by means of agitator 5. Alternately, the Werner complex may be formed in situ in the mixing vessel 1 by separately adding the desired metal salt and the nitrogen base. It is only necessary to form the solution at the beginning of the process inasmuch as the solvent-complex solution is continuously recycled through line 2 after the process is initiated. Once the process is in continuous operation the port 3 may be kept closed, except for periodic intervals to add small additional amounts of the Werner complex to make up for slight losses thereof.

When the complex is completely dissolved in the solvent, the feed xylenes may be introduced through line 6 while continuing agitation. It is preferable to add sufficient of the xylene mixture to provide between about 5% and 60% by weight of para-xylene to Werner complex. It is usually preferable to maintain the temperature in the mixing vessel 1 slightly below the boiling point of the xylenes in order to avoid the necessity for pressure vessels; however, by the use of higher temperatures and a pressure vessel, the capacity of the solvent for the xylenes and the complex may be still further increased.

After the xylenes have been dissolved, the homogeneous mixture is then withdrawn through line 7 and cooled in heat exchanger 8 to preferably between about 10° and 50° C. Upon cooling the mixture the solid complex begins to precipitate out, forming a somewhat viscous slurry. This slurry is then fed through line 9 to a filter 10 which may preferably be of the continuous Oliver type. The precipitated complex, containing para-xylene, accumulates on the periphery of the filter rotor 11 from which it is continuously scraped by blade 12. The precipitate on the rotor 11 may be continuously washed by sparger 13, employing either a low-boiling paraffin hydrocarbon or part of the cool, stripped solvent as wash liquid, as will be more particularly described hereinafter. The washing step is for the purpose of removing adsorbed xylenes from the surface of the solid. The spent wash is taken off through line 14 as filtrate, in admixture with the solvent containing the unabsorbed xylenes. This combined filtrate is then passed via line 14 to distillation column 15 wherein an overhead is taken off through line 16 consisting of wash solvent, if a low-boiling paraffin is employed, plus an azeotrope of the solvent and unabsorbed xylenes. This overhead is then further fractionated in distillation column 17 to give an overhead consisting essentially of the low-boiling wash solvent which is taken off through line 18 and condensed in heat exchanger 40. The bottoms from distillation column 17 is taken off through line 20 and consists essentially of a condensed azeotrope of solvent plus unabsorbed xylenes. This condensed azeotrope is then admixed with water in mixing valve 21 and passed into decanter 22 from which the supernatant phase, consisting of unabsorbed xylenes, is taken off through line 23. The lower phase from decanter 22 consists of a mixture of water and solvent which is removed through line 24 and passed into azeotropic distillation column 25, wherein the water may be separated from the solvent by means of azeotropic distillation with a material such as benzene, which forms an azeotrope with water boiling below the benzene-solvent azeotrope or the solvent-water azeotrope. The benzene-water azeotrope taken off through line 26 is thereafter condensed and separated by decantation. The bottoms from distillation colurn 25 consists of the dehydrated solvent which is taken out through line 27 and returned to mixing vessel 1 through line 2.

The solid precipitate from the filter 10, consisting of the solid complex plus absorbed para-xylene, is then transferred by suitable conveyor means 28 to a hopper 29, and thence is admitted to mixing vessel 30. Stripped solvent removed as bottoms from distillation column 15 is passed through line 31 to mixing vessel 30. The mixture of solvent plus clathrate is then heated and agitated in vessel 30 until solution is complete. Dissolving the clathrate in the solvent liberates the absorbed para-xylene. This mixture is then withdrawn through line 32 and passed to a distillation column 33. In this column an azeotrope of para-xylene plus solvent is taken off through line 34, condensed by means of condenser 35 and then mixed with water in mixing valve 36. Only sufficient water is required at this point to throw the xylene out of solution. The two-phase system from mixing valve 36 is then passed into decanter 37 wherein the supernatant para-xylene is removed through line 38. The lower solvent-water phase is removed through line 39 and passed into azeotropic distillation column 25 wherein the water is removed overhead by azeotropic distillation as previously described in connection with the aqueous phase from decanter 22. The azeotropic distillation in column 25 is not required where the solvent does not form an azeotrope with water. However, in the case of methyl Cellosolve and ethyl Cellosolve such azeotropes are formed, and it is therefore necessary to dehydrate the solvent-water mixture by means other than simple distillation. Many other equivalent azeotroping agents may be used, for example toluene, aniline, etc., or any other dehydration method.

The para-xylene obtained from decanter 37 may be of any desired purity, depending upon a number of process variables such as the ratio of feed xylenes to complex, the efficiency of the washing step, etc. In case the feed mixture contained ethylbenzene, the supernatant phase in decanter 37 will also contain ethylbenzene since the complexes described herein for the most part absorb ethylbenzene, though somewhat less readily than para-xylene. In this case the para-xylene-ethylbenzene mixture removed through line 38 may be further resolved by fractional distillation or fractional crystallization to obtain pure para-xylene and ethylbenzene.

The system described above includes a washing step with a lower paraffinic hydrocarbon on the filter 10. The use of a low-boiling hydrocarbon at this step may be dispensed with, and part of the stripped solvent from line 31 may be diverted through line 31a to line 18 and used as a wash solvent. In this case the heat exchanger 40 may function to cool the solvent to the point where it has a low solubility for the solid complex, but still has appreciable solvent capacity for xylenes. Also, in this case the second distillation column 17 may be omitted entirely, and the overhead from column 15 may be condensed and passed directly through lines 16, 16a and 20 to mixing valve 21, since it will consist entirely of the solvent-xylene azeotrope. Either of the above described washing systems is found to give satisfactory results; by using the solvent, one distillation column may be omitted, but the hydrocarbon wash liquid is sometimes advantageous because it is less viscous and has a greater selective solvent capacity for xylenes as opposed to the solid complex.

In another modification of the invention the solid clathrate in hopper 29 may be azeotropically stripped of its absorbed xylenes without being redissolved in the solvent. In this case the clathrate is merely transferred to a stripping column, not shown, where vapors of the azeotrope former, which may either be a component of the original solvent or a non-solvent material, are passed through a stationary or moving bed of the clathrate. The azeotrope of xylene plus the azeotrope-former is then separated by water washing or other suitable method. The stripped complex is then returned to mixing vessel 1 as a solid, and the solvent bottoms from distillation column 15 is also recycled directly to vessel 1. Obviously many other variations may be made in the details of the procedure described without departing from the broad scope of the invention.

Reference is now made to the attached Figure 2 which is a semi-diagrammatic flowsheet illustrating a multi-stage clathration process, and employing the preferred ternary azeotrope system for recovering the clathrated xylenes and the reject xylenes from, for example, methyl Cellosolve solvent. The basic unit operations of clathration and solids separation are similar to those described above in connection with Figure 1 and hence the description thereof will not be repeated in detail. The feed mixture of C-8 hydrocarbons is dissolved at step I in hot recycle solvent, e. g. methyl Cellosolve plus dissolved Werner complex from recycle line 50. A supplementary recycle stream of solvent-xylene azeotrope derived as described hereinafter is admitted through line 51. The hot solution formed in step I is then cooled to e. g. 10°–50° C. at step II to precipitate the solid clathrate. This comprises the first clathration stage. The solid clathrate containing impure p-xylene is separated at step III as by centrifuging or filtration, and the filtrate consisting mainly of methyl Cellosolve plus unclathrated xylenes (reject xylenes) is transferred via line 53 to distillation column 54. In the multi-stage procedure herein illustrated it is preferable to operate the first clathration stage to obtain maximum recovery of para-xylene from the feed mixture, whereby the filtrate is essentially free of para-xylene. This may be accomplished for example by employing high mole ratios of complex to para-xylene in the feed mixture, and/or by cooling in step II to a sufficiently low temperature to completely precipitate the solid clathrate plus any unused complex.

In distillation column 54 the mixture of solvent, reject xylenes and small amounts of dissolved Werner complex is subjected to fractionation in the lower sections thereof whereby at an intermediate point in the column there is formed a binary azeotrope of methyl Cellosolve plus xylenes. This azeotrope boils at 116–120° C. and is composed of about 58% methyl Cellosolve and 42% xylenes. The binary azeotrope is then broken by means of a recycle stream of water plus methyl Cellosolve which is introduced near the top of the column through line 55. The introduction of this aqueous stream results in the concentration upwardly in the column of the water-methyl Cellosolve-xylene ternary which boils at 92° C., and is composed of about 65 volume percent xylene, 30% water and 5% methyl Cellosolve. This ternary mixture is taken overhead through line 56, condensed in condenser 57 and passed into liquid-liquid separator 58. The supernatant phase so formed consists of essentially pure reject xylenes, containing only about 0.2% of methyl Cellosolve. This xylene stream is withdrawn through line 59. The lower aqueous phase in separator 58 consists of water plus methyl Cellosolve in the ratio of about 30 parts of water to 5 parts of methyl Cellosolve. This mixture is withdrawn and recycled continuously through line 55 to column 54. Small amounts of make-up water may be added periodically or continuously through line 60 to compensate for small water losses to the xylene phase. It will be apparent that this procedure avoids the difficult separation of water from methyl Cellosolve. The bottoms from column 54 is essentially water-free and xylene-free methyl Cellosolve which is withdrawn through line 61 and recycled as described hereinafter.

In the operation of column 54 it is important to note that the aqueous recycle stream in line 55 is introduced near the top of the column. It is desired to operate the column so that essentially no water is present in the lower sections thereof in order to prevent the formation of low-boiling azeotropes of water and nitrogen base, e. g. γ-picoline. By operating in this manner, a buffer zone is established in the central portion of the column which is occupied by the intermediate-boiling solvent-xylene binary azeotrope, thus isolating the upper aqueous ternary from the higher boiling nitrogen base in the lower part of the column.

The solid clathrate separated at step III may be subjected to an optional washing at step IV with a portion of cool solvent from line 63. The solid clathrate is then mixed and heated in step V with solvent from line 64 derived from a subsequent clathration stage to be described hereinafter. The resulting solution is then cooled at step VI to reprecipitate the clathrate. The cooling at step VI may be to the same temperature as employed in step II, but in order to obtain incomplete precipitation, temperatures of 5°–10° C. higher than at step II may be employed. Incomplete precipitation sometimes effects an increase in purity of the clathrated xylenes.

The slurry of clathrate plus solvent from step VI is then again separated at step VII. The filtrate is taken off through line 65 and transferred to distillation column 66 in admixture with spent wash solvent from line 67. The combined mixture admitted to column 66 is composed essentially of solvent plus dissolved xylenes plus small amounts of dissolved Werner complex. The xylenes contained therein are preferably at least as rich in p-xylene as the feed mixture, and hence may be recycled to the first clathration stage, step I. However, it is necessary to separate at least partially the xylenes from the solvent in order to avoid building up an excessive solvent ratio in step I. Therefore, column 66 is operated to top the mixture, taking overhead through line 69 a solvent-xylene azeotrope for recycle to step I, and taking off as bottoms in line 70 a stripped solvent for use in the third clathration stage beginning at step IX.

The rectified solid clathrate from step VII may optionally be washed at step VIII with cool solvent from line 71. This wash solvent is preferably derived by taking a slip-stream of cold recycle solvent from line 64. The washed clathrate is then transferred to the next mixing and heating step IX. Xylene-free recycle solvent from column 66 is admitted to mixing step IX via line 70, together with a supplemental stream of xylene-free solvent from line 72 to make up for solvent which went overhead as azeotrope in line 69, and the combined mixture is heated to re-dissolve the clathrate. The solution is then cooled at step X to reprecipitate the clathrate. Clathration at this third stage may be at a somewhat higher temperature than the second stage (step VI) e. g. 5–10° C. higher, in order to obtain maximum purity. The cool slurry from step X is then subjected to a final separation at step XI. The filtrate from this step ordinarily contains a small proportion of xylenes which ordinarily is richer in para-xylene than the feed mixture, and is therefore suitable for recycling to the second clathration stage. To accomplish this recycle, the filtrate from step XI may be withdrawn through line 73, and recycled directly to step V via lines 74 and 64. This procedure is preferred where cooling step X is carried to the same final temperature as step II; in such case the solvent capacity of the mother liquor for the clathrate at step V is sufficient to completely redissolve the clathrate at step V. However, if cooling step X is conducted at a higher temperature than step II, the mother liquor from the former will contain sufficient dissolved complex to restrict its solvent capacity at step V. To overcome this problem, the filtrate in line 73 may be diverted through a cooler 75 where it is cooled to approximately the temperature employed at step II, thereby precipitating additional solid complex. The resulting slurry is then passed via line 76 to settling tank 77, from which the solid complex, or a concentrated slurry thereof, is removed through line 78 and recycled to line 50 for re-use in the first clathration stage. The supernatant liquid is withdrawn through line 64 and recycled to step V as previously described.

The final clathrate from step XI is transferred to a final mixing stage XII to which is admitted xylene-free recycle solvent from line 61. The resulting slurry is then heated to obtain either partial or complete solution. The hot mixture is then transferred via line 80 to distillation column 81.

The distillation in column 81 is essentially the same as that described in connection with column 54, i. e. the water-xylene-methyl Cellosolve ternary is taken overhead through line 82, condensed, and separated in separator 83. The water-methyl cellosolve phase is recycled through line 84 to column 81. Any required makeup water is added periodically through line 85 to compensate for any small amounts of water which may be carried out of the system in the product xylene. The product para-xylene, of for example 95 to 100° purity, forms the supernatant phase in separator 83, and is removed as product through line 86. The bottoms from column 81 consists essentially of solvent together with the dissolved Werner complex, and is removed through line 87 and recycled via line 50 to the initial mixing step I. This particular distillation scheme is especially advantageous in column 81, where the distillation is conducted in the presence of large amounts of the Werner complex. By taking overhead only the low boiling ternary azeotrope, it is possible to avoid almost completely the volatilization and loss of the nitrogen base component of the Werner complex, e. g. gamma-picoline.

The invention may perhaps be more readily understood from the following examples, which should not however be considered as delineating the scope thereof.

EXAMPLE I

A sample of the nickel thiocyanate-gamma-picoline Werner complex was prepared as follows: An aqueous solution of nickel thiocyanate was formed by adding two molar equivalents of potassium thiocyanate to a 10% solution of nickel chloride. To this solution was added with stirring four molar equivalents of gamma-picoline. A blue precipitate settled out almost immediately, and was recovered by filtration. The precipitate was dried in a stream of air at room temperature, and was found by analysis to correspond to the formula:

$$[Ni(gamma-picolino)_4(SCN)_2]$$

By procedures similar to the above, merely substituting the appropriate metal salt or amine, samples of the following compounds were prepared:

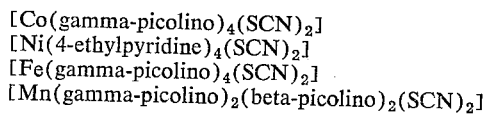

$$[Co(gamma-picolino)_4(SCN)_2]$$
$$[Ni(4-ethylpyridine)_4(SCN)_2]$$
$$[Fe(gamma-picolino)_4(SCN)_2]$$
$$[Mn(gamma-picolino)_2(beta-picolino)_2(SCN)_2]$$

EXAMPLE II

Thirty grams of the dry cobalt thiocyanate Werner complex of gamma-picoline

$$[Co(gamma-picolino)_4(SCN)_2]$$

prepared as outlined above was placed in a Dewar flask equipped with a stirrer and 100 ml. of a 1:1 mixture by volume of methyl Cellosolve and butyl Cellosolve was added. The mixture was heated by boiling methyl Cellosolve in the outer jacket and agitated until solution was complete. The final temperature was about 110° C. To this solution was then added 20 ml. of mixed C-8 aromatic hydrocarbons having the composition given in Table I under feed mixture. The xylenes rapidly went into solution.

After the solution was completely homogeneous, heating was discontinued and the mixture was allowed to cool with continued agitation. As cooling continued a pink solid settled out and when the mixture had reached room temperature the solid was removed by filtration. The filtrate was subjected to distillation and a xylene-methyl Cellosolve azeotrope collected as the distillate. The xylene content of the distillate was recovered from the azeotropic condensate by water washing. This hydrocarbon phase was sample No. 2, consisting of the rejected hydrocarbons.

The solid from the filtration step was then admixed with 100 ml. of a 1:1 mixture by volume of methyl Cellosolve and butyl Cellosolve and the mixture subjected to distillation in a small column equivalent to about 5 theoretical plates. The xylene content of the solid was collected in the distillate as an azetrope with methyl Cellosolve boiling at 116° C.–120° C. The xylene content of the azeotropic condensate was then recovered as before by water washing. The hydrocarbon phase recovered was sample No. 1, comprising the absorbed xylenes. Analyses of the feed mixture and samples 1 and 2 gave the following results:

*Table 1*

|سample | Volume, ml. | Composition of samples, vol. Percent | | | | Ratio, m-xylene p-xylene |
|---|---|---|---|---|---|---|
| | | p-Xylene | m-Xylene | o-Xylene | Ethyl-benzene | |
| Feed | 20.0 | 22.6 | 51.2 | 7.7 | 18.5 | 2.26 |
| (1) Absorbed hydrocarbons | 4.2 | 64.2 | 16.2 | 2.3 | 17.3 | 0.25 |
| (2) Rejected hydrocarbons | 12.3 | 6.6 | 65.1 | 8.4 | 19.9 | 9.88 |

Analysis of an aliquot of the total azeotropic distillate from which sample No. 1 was obtained showed a nitrogen content corresponding to less than about 0.6% decomposition of the Werner complex. This example shows that by separating the absorbed xylenes from the complex by distillation with a material which forms a low-boiling azeotrope with the xylenes and does not azeotrope with gamma-picoline the absorbed xylenes may be recovered with very little decomposition of the complex. By employing a more efficient column to separate the xylene-solvent azeotrope from the gamma picoline, decomposition of the complex may be reduced to practically nil. The example shows also that a feed mixture containing 22.6% para-xylene may be resolved in a single absorption stage, without washing, to obtain a rich fraction almost ten times as rich in para-xylene as the corresponding lean fraction, or almost three times as rich as the feed mixture.

EXAMPLE III

By repeating the procedure of Example II using ethyl Cellosolve as the solvent and the ferrous thiocyanate complex of gamma-picoline

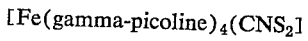

$$[Fe(gamma-picoline)_4(CNS_2)]$$

as the clathrate former, a substantially similar resolution of the feed mixture is obtained, with less than 0.5% decomposition of the Werner complex.

EXAMPLE IV

The procedure of Example II is repeated except that butyl Cellosolve alone is used as the solvent and the solid clathrate recovered, instead of being redissolved in more of the solvent, is simply subjected to stripping with vapors of isobutyl alcohol. The azeotropic condensate obtained from the stripping operation is then washed with water and the hydrocarbon phase analyzed for its xylene content. The resolution obtained is similar to that of Example II and the decomposition of the Werner complex is reduced to practically nil.

By employing a wash solvent in any of the above examples the ratio of para-xylene in the recovered rich phase may be substantially increased. The above procedures may aso be employed to separate ethylbenzene from meta-xylene and/or ortho-xylene.

From the above description it will be seen that the invention described herein provides a remarkably efficient method for separating xylene isomers by extractive crystallization with Werner complexes, and that the procedure results in practicaly 100% recovery of the Werner complexes employed. By substituting other hydrocarbon mixtures, or other mixtures of organic compounds, for the feed mixtures of the examples, similar separations may be achieved, either with the same Werner complexes or others as disclosed herein.

This application is a continuation-in-part of application Serial No. 309,875, filed September 16, 1952, now abandoned.

The foregoing disclosure of this invention is not to be considered as limiting since many variations may be made by those skilled in the art without departing from the scope or spirit of the following claims:

I claim:

1. A process for resolving a mixture of aromatic hydrocarbons differing in molecular configuration by extractive crystallization with a solid Werner complex, said Werner complex consisting of a metal salt coordinated with 2 to 6 moles of a heterocyclic nitrogen base, which comprises dissolving said hydrocarbons and said Werner complex in a solvent, said solvent consisting essentially of a lower aliphatic mono-alcohol containing at least three carbon atoms, cooling the resulting solution to precipitate a solid clathrate phase composed of said Werner complex containing intimately absorbed therein the most readily clathratable fraction of said hydrocarbons, thereby leaving a less readily clathratable fraction of said hydrocarbons in a phase distinct from said solid clathrate phase, and thereafter recovering said hydrocarbon fractions separately from said two phases.

2. A process as defined in claim 1 wherein said solvent is selected from the group consisting of monoalkyl ethers of lower alkylene glycols, and monoalkyl ethers of lower alkylene polyglycols.

3. A process as defined in claim 1 wherein said mixture of aromatic hydrocarbons comprises isomeric alkylbenzenes.

4. A process as defined in claim 1 wherein said metal salt is selected from the group consisting of the cyanides, thiocyanates, isothiocyanates, azides, cyanates and isocyanates of metals of atomic number above 12.

5. A process for resolving a mixture of aromatic hydrocarbons comprising at least two C-8 alkyl benzene isomers by extractive crystallization with a solid Werner complex, said Werner complex consisting of a metal salt coordinated with 2 to 6 moles of a 4-substituted pyridine base, which comprises dissolving said hydrocarbons and said Werner complex in a solvent, said solvent consisting essentially of a member selected from the group consisting of monoalkyl ethers of lower alkylene glycols and monoalkyl ethers of lower polyalkylene glycols, cooling the resulting solution to precipitate a solid clathrate phase composed of said Werner complex containing intimately absorbed therein a hydrocarbon fraction enriched in one of said C-8 isomers, thereby leaving an unabsorbed hydrocarbon fraction in liquid phase which is relatively enriched in another of said C-8 isomers, and thereafter recovering said hydrocarbon fractions separately from said clathrate phase and from said liquid phase.

6. A process as defined in claim 5 wherein said metal salt is selected from the group consisting of the cyanides, thiocyanates, isothiocyanates, azides, cyanates, and isocyanates of metals of atomic number above 12.

7. A process as defined in claim 5 wherein said metal salt is nickel thiocyanate.

8. A process as defined in claim 5 wherein said metal salt is ferrous thiocyanate.

9. A process as defined in claim 5 wherein said metal salt is manganous thiocyanate.

10. A process as defined in claim 5 wherein said metal salt is cobalt thiocyanate.

11. A process for resolving a mixture of aromatic hydrocarbons comprising essentially para-xylene and at least one member selected from the group consisting of ortho-xylene, meta-xylene and ethylbenzene by extractive crystallization with a solid Werner complex, said Werner complex consisting of a metal thiocyanate coordinated with 2 to 6 moles of a 4-alkylpyridine, which comprises dissolving said hydrocarbons and said Werner complex in a solvent which is essentially methyl Cellosolve, cooling the resulting solution to precipitate a solid clathrate phase composed of said Werner complex containing intimately absorbed therein a hydrocarbon fraction enriched in para-xylene, thereby leaving a para-xylene-lean hydrocarbon fraction in liquid phase, and thereafter recovering said hydrocarbon fractions separately from said clathrate phase and from said liquid phase.

12. A process as defined in claim 1 wherein said metal is selected from the group consisting of nickel, iron, cobalt and manganese.

13. A process for resolving a mixture of hydrocarbons by extractive crystallization in a solid Werner complex of a metal salt and a heterocyclic nitrogen base, said mixture of hydrocarbons including an aromatic hydrocarbon which: (a) differs in molecular configuration from another of said hydrocarbons, and (b) boils in the same range as said organic nitrogen base; which comprises dissolving said hydrocarbon mixture and said Werner complex at a relatively high temperature in a monohydric alcohol solvent which: (1) has a high solvent capacity for said hydrocarbon mixture and said Werner complex at high temperatures but a low solvent capacity for said Werner complex at low temperatures, (2) boils at a temperature at least about 5° C. removed from the boiling point of said aromatic hydrocarbon, (3) has a lesser tendency to form clathrates with said Werner complex than does said aromatic hydrocarbon, and (4) is capable of forming a binary azeotrope with said aromatic hydrocarbon, said binary azeotrope boiling: (a) lower than any binary azeotrope formed between said solvent and said nitrogen base, and (b) lower than said nitrogen base; cooling the resulting solution to precipitate a solid phase consisting of said complex plus an absorbed hydrocarbon fraction rich in said aromatic hydrocarbon, separating said solid phase, treating the residual solvent phase to strip out unabsorbed hydrocarbons, mixing said solid phase with said stripped solvent phase, and azeotropically distilling the mixture containing liquid solvent to recover said absorbed fraction of said hydrocarbons as an azeotrope with said solvent.

14. A process as defined in claim 13 wherein said hydrocarbon mixture is essentially composed of close-boiling alkaryl hydrocarbons, and said Werner complex has the formula:

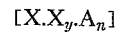

wherein X is a metal having an atomic number above 12, Z is a heterocyclic nitrogen base, y is a number from 2 to 6, A is a negative radical selected from the group consisting of cyanide, thiocyanate, isothiocyanate, azide, cyanate and isocyanate, and n is a number from 1 to 3.

15. A process as defined in claim 14 wherein said solvent is essentially a lower aliphatic glycol mono-ether.

16. A process as defined in claim 13 wherein said hydrocarbon mixture is composed essentially of close-boiling alkaryl hydrocarbons, and said Werner complex is nickel dithiocyanate.

17. A process as defined in claim 13 wherein said hydrocarbon mixture is composed essentially of close-boiling alkaryl hydrocarbons, and said Werner complex is ferrous dithiocyanate.

18. A process as defined in claim 13 wherein said hydrocarbon mixture is composed essentially of close-boiling alkaryl hydrocarbons, and said Werner complex is manganese dithiocyanate.

19. A process as defined in claim 13 wherein said hydrocarbon mixture is composed essentially of close-boiling alkaryl hydrocarbons, and said Werner complex is cobalt dithiocyanate.

20. A process for resolving a mixture of hydrocarbons by extractive crystallization in a solid Werner complex of a metal salt and a heterocyclic nitrogen base, said mixture of hydrocarbons including an aromatic hydrocarbon which: (a) differs in molecular configuration from another of said hydrocarbons, and (b) boils in the same range as said organic nitrogen base; which comprises dissolving said hydrocarbon mixture and said Werner complex at a relatively high temperature in a monohydric alcohol solvent which: (1) has a high solvent capacity for said hydrocarbon mixture and said Werner complex at high temperatures but a low solvent capacity for said Werner complex at low temperatures, (2) boils at a temperature at least about 5° C. removed from the boiling point of said aromatic hydrocarbon, (3) has a lesser tendency to form clathrates with said Werner complex than does said aromatic hydrocarbon, (4) is capable of forming a binary azeotrope with said aromatic hydrocarbon, said binary azeotrope boiling: (a) lower than any binary azeotrope formed between said solvent and said nitrogen base, and (b) lower than said nitrogen base; and (5) is capable of forming a ternary azeotrope with water and said aromatic hydrocarbon, said ternary azeotrope boiling lower than any of said binary azeotropes; cooling the resulting solution to precipitate a solid phase consisting of said complex plus an absorbed hydrocarbon fraction rich in said aromatic hydrocarbon, separating said solid phase, treating the residual solvent phase to strip out unabsorbed hydrocarbons, mixing said solid phase with said stripped solvent phase and azeotropically distilling the mixture containing liquid solvent to fractionate upwardly a binary azeotrope composed of said aromatic hydrocarbon and said solvent, further fractionating said binary azeotrope in a ternary azeotroping zone in the presence of water to form a still lower boiling ternary azeotrope composed of water, solvent and said aromatic hydrocarbon, removing said ternary azeotrope as overhead and condensing the same to form a bi-phase liquid system, and recycling the aqueous phase of said liquid system to said ternary azeotroping zone.

21. A process according to claim 20 wherein said hydrocarbon mixture comprises p-xylene and at least one member selected from the group consisting of o-xylene and m-xylene, and wherein said Werner complex comprises a salt of a metal of atomic number above 12 coordinated with a 4-substituted pyridine base.

22. A process according to claim 20 wherein said hydrocarbon mixture comprises p-xylene and at least one member selected from the group consisting of o-xylene and m-xylene, said solvent comprises a lower aliphatic glycol monoether boiling above about 100° C., and wherein said Werner complex comprises a salt of a metal of atomic number above 12 coordinated with a 4-alkyl pyridine.

23. A process for separating an aromatic hydrocarbon from a clathrate thereof with a solid Werner complex, said Werner complex being composed of a salt of a metal of atomic number above 12 coordinated with a heterocyclic nitrogen base, said nitrogen base boiling in the same range as said aromatic hydrocarbon, which comprises azeotropically distilling said clathrate with vapors of an aliphatic monohydroxy compound capable of: (1) forming a first binary azeotrope with said aromatic hydrocarbon which is lower boiling than said nitrogen base and lower boiling than any nitrogen base-monohydroxy compound binary azeotrope, and (2) forming a ternary azeotrope with water and said aromatic hydrocarbon, said ternary azeotrope being lower boiling than any of said binary azeotropes; whereby said first binary azeotrope is formed and is fractionated upwardly from said nitrogen base, further fractionating said binary azeotrope in a ternary azeotroping zone in the presence of water, thereby distilling overhead said low-boiling ternary azeotrope, condensing said ternary azeotrope to form a bi-phase liquid system, and recycling the aqueous phase of said liquid system to said ternary azeotroping zone, and recovering substantially water-free aromatic hydrocarbon from said bi-phase system.

24. A process as defined in claim 23 wherein said aliphatic monohydroxy compound is essentially a lower aliphatic glycol monoether.

25. A process as defined in claim 23 wherein said clathrate is dissolved in said aliphatic monohydroxy compound, and the solution is subjected to distillation to effect said stripping.

26. A process as defined in claim 23 wherein said clathrate is stripped with vapors of said aliphatic monohydroxy compound while the former is in an essentially solid state.

References Cited in the file of this patent

UNITED STATES PATENTS

| | | |
|---|---|---|
| 2,381,996 | Bloomer | Aug. 14, 1945 |
| 2,463,479 | Denton et al. | Mar. 1, 1949 |
| 2,499,820 | Fetterly | Mar. 7, 1950 |
| 2,584,036 | Mahoney et al. | Jan. 29, 1952 |
| 2,627,513 | Arey | Feb. 3, 1953 |
| 2,652,438 | Arnold et al. | Sept. 15, 1953 |
| 2,732,413 | Jones et al. | Jan. 24, 1956 |

OTHER REFERENCES

Jour. Chem. Soc. (London), 1950, p. 3346, art. by Evans et al.

Jour. Chem. Soc. (London), 1952, pp. 319–28, art. by Rayner et al.

Nature, vol. 163, pp. 566–7 (1949), art. by Powell et al.

Chem. Abstracts, vol. 45, p. 3245a–i (1951), orig. art. by Bughulen et al.

Jour. Chem. Phys., vol. 18 (1950), pp. 750–1, art. by Smith.

Jour. Chem. Soc. (London), 1948, pp. 61–73, art. by Powell.

Analytical Chem., vol. 21 (1949), p. 832, art. by Horsley.